United States Patent Office 3,072,494
Patented Jan. 8, 1963

3,072,494
CALCIUM SULFATE PLASTERS CONTAINING STEARAMIDOPROPYLDIMETHYL - BETA - HYDROXYETHYLAMMONIUM SALTS
Allan E. Sherr, Norwalk, Conn., and Joseph Roshal, Bronx, N.Y., assignors to American Cyanamid Company, New York, N.Y., a corporation of Maine
No Drawing. Filed Sept. 9, 1959, Ser. No. 838,845
6 Claims. (Cl. 106—111)

This invention relates to plaster compositions and more particularly to calcium sulfate plasters such as plaster of Paris, gypsum plaster or stucco and the like. The principal object of the invention is to provide a novel additive for such plasters which will lengthen their setting time.

Hydratable calcium sulfate plasters of the type dealt with by the invention are sold as dry powders, the principal ingredient of which is calcium sulfate hemihydrate or plaster of Paris. The powders may also contain anhydrite as well as cellulosic fillers, foaming agents and the like. In use they are mixed with water to a smooth paste for application to cracks or joints between adjacent edges of wall board or for making cast or molded plaster objects. To facilitate these and other similar uses it is frequently advantageous to lengthen or extend the time of setting of the plaster-water mixes beyond their normal time. A number of set-retarders have been suggested for this purpose, principal among which are the products obtained by digesting horn, hair and other keratinous materials with aqueous caustic solutions. However, in the substantial quantities in which these are used they sometimes affect the qualities of the plaster, pose storage problems in hot weather and are open to other difficulties.

Our present invention is based on the discovery that stearamidopropyldimethyl-beta - hydroxyethylammonium salts are effective set retarders for unset calcium sulfate plasters even when used in very small amounts. The stearamidopropyldimethyl - beta-hydroxyethylammonium salts have been sold commercially for some time now as antistatic agents for phonograph records and other objects composed of molded organic plastics and are described for this purpose in U.S. Patent No. 2,626,876. They have the following chemical formula

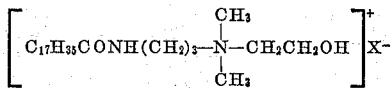

where X is an anion such as the nitrate, chloride or dihydrogen phosphate. We have found that they are effective set retarding agents for hydratable calcium sulfate plasters when used in quantities as small as 0.0007% based on the dry weight of the plaster. Larger quantities up to about 2% will increase still further the setting time of plaster-water mixes, but quantities larger than about 1.5% are seldom used.

The stearamidopropyldimethyl - beta-hydroxyethylammonium salts are all water-soluble, and therefore they are most easily applied by dissolving them in the water used to hydrate the plaster. However, dry mixes of calcium sulfate hemihydrate and anhydrite with or without other solid ingredients are frequently sold as commercial dry plasters, and these may advantageously contain from 0.0007% to about 1.5% of stearamidopropyldimethyl-beta-hydroxyethylammonium salt such as the nitrate or dihydrogen phosphate in uniform admixture. Such dry plasters are readily prepared by mixing a water solution of the stearamidopropyldimethyl - beta - hydroxyethylammonium salt with gypsum before it is converted into plaster of Paris or anhydrite by calcination.

Typical compositions constituting preferred embodiments of the invention are described in the following examples to which, however, the invention in its broadest aspects is not limited.

*Examples*

The stearamidopropyldimethyl - beta - hydroxyethylammonium salt under test is dissolved in water to a concentration corresponding to the amount desired in the plaster mix. Either 40 ml. or 50 ml. of the solution is placed in a stainless steel cup and 50 grams of plaster of Paris are added. The plaster is allowed to soak for 15 seconds, is mixed with a spatula for 2 minutes and is then dumped onto wax paper on a flat, level surface. The setting time is measured from the time of dumping until the time when a Vicat needle will no longer sink into a plaster patty.

Stearamidopropyldimethyl - beta - hydroxyethylammonium nitrate and dihydrogen phosphate were tested by this procedure at consistencies of 80 and 100 (40 and 50 ml. of solution, respectively, for 50 grams of plaster of Paris). In the headings of the following table "Conc." means percent of the salt on the dry weight of the plaster and "Set Time" means the setting time in minutes. The results were as follows.

| Salt | Conc. | Consistency | Set Time | Consistency | Set Time |
|---|---|---|---|---|---|
| None | | 80 | 40 | 100 | 37 |
| Nitrate | 1.3 | 80 | 51 | 100 | 49 |
| Do | 0.13 | 80 | 46 | 100 | 43 |
| Do | 0.013 | 80 | 42 | 100 | 39 |
| Do | 0.0013 | 80 | 42 | 100 | 38 |
| Do | 0.00013 | 80 | 42 | 100 | |
| None | | 80 | 23 | 100 | 37 |
| Phosphate | 0.7 | | | 100 | 167 |
| Do | 0.07 | 80 | 44 | 100 | 41 |
| Do | 0.007 | 80 | 39 | 100 | 40 |
| Do | 0.0007 | 80 | 38 | 100 | 38 |
| None | | 80 | 45 | | |
| Phosphate | 1.4 | 80 | 240+ | | |
| Do | 0.14 | 80 | 83 | | |
| Do | 0.014 | 80 | 66 | | |
| Do | 0.0014 | 80 | 45 | | |
| Do | 0.00014 | 80 | 45 | | |

What we claim is:

1. A method of retarding the rate of set of an unset calcium sulfate plaster which comprises incorporating therein from 0.0007% to about 1.5% of a member of the group consisting of stearamodipropyldimethyl - beta - hydroxyethylammonium nitrate and stearamidopropyldimethyl-beta-hydroxyethylammonium dihydrogen phosphate.

2. A method according to claim 1 in which the salt is stearamidopropyldimethyl - beta - hydroxyethylammonium nitrate.

3. A method according to claim 1 in which the salt is stearamidopropyldimethyl - beta - hydroxyethylammonium dihydrogen phosphate.

4. A calcium sulfate plaster consisting essentially of a hydratable calcium sulfate having from 0.0007% to about 1.5% of a stearamidopopyldimethyl-beta-hydroxyethylammonium nitrate and stearamidopropyldimethyl-betahydroxyethylammonium dihydrogen phosphate mixed uniformly therewith.

5. A calcium sulfate plaster consisting essentially of a hydratable calcium sulfate having from 0.0007% to about 1.5% of stearamidopropyldimethyl-beta-hydroxyethylammonium nitrate mixed uniformly therewith.

6. A calcium sulfate plaster consisting essentially of a hydratable calcium sulfate having from 0.007% to about 1.5% of stearamidopropyldimethyl-beta-hydroxyethylammonium dihydrogen phosphate mixed uniformly therewith.

References Cited in the file of this patent

UNITED STATES PATENTS

| | | |
|---|---|---|
| 2,239,925 | McKee | Apr. 29, 1941 |
| 2,529,835 | Dailey | Nov. 14, 1950 |
| 2,607,427 | Bond | Aug. 19, 1952 |
| 2,626,876 | Carnes | Jan. 27, 1953 |
| 2,848,340 | Haldas | Aug. 19, 1958 |
| 2,913,346 | Hoffman | Nov. 17, 1959 |

FOREIGN PATENTS

| | | |
|---|---|---|
| 563,201 | Canada | Sept. 9, 1958 |